March 17, 1925.　　　　F. W. FISCHER　　　1,530,313
TIRE TOOL
Filed Nov. 13, 1923　　2 Sheets-Sheet 1
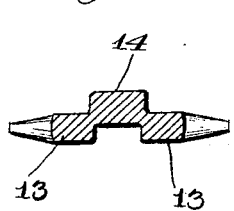
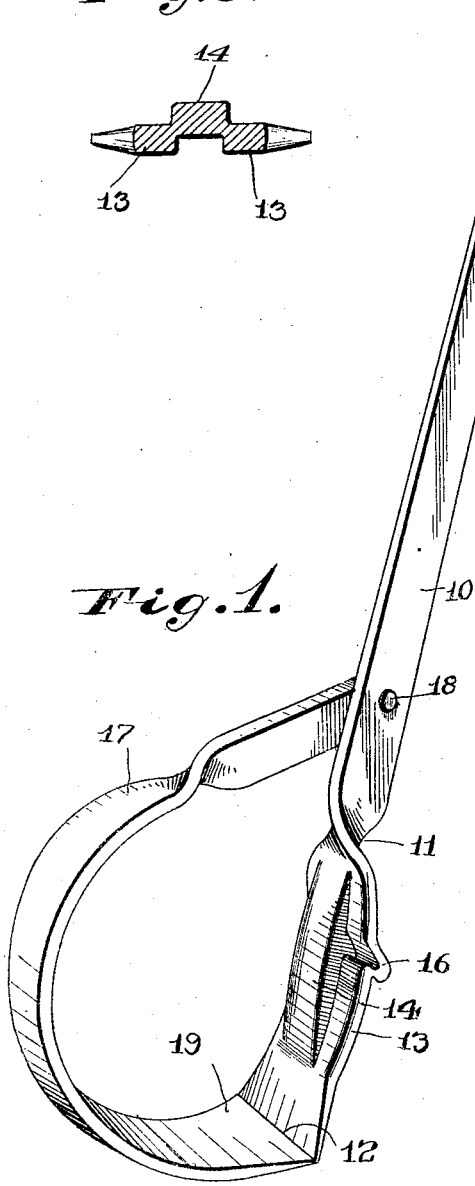
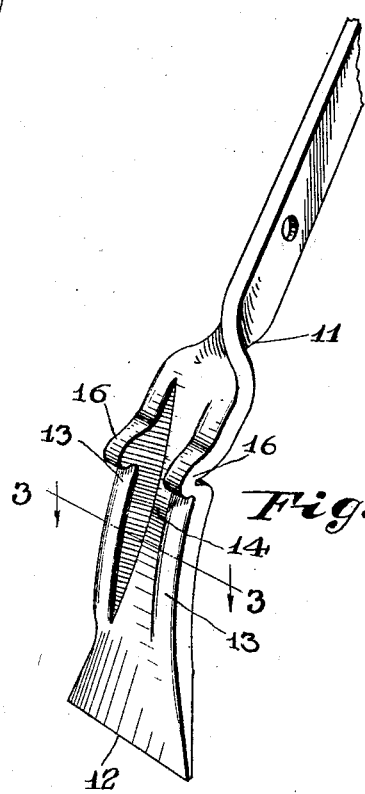
Inventor
F. W. Fischer.
By Watson E. Coleman
Attorney March 17, 1925.  
F. W. FISCHER  
TIRE TOOL  
Filed Nov. 13, 1923
1,530,313
2 Sheets-Sheet 2
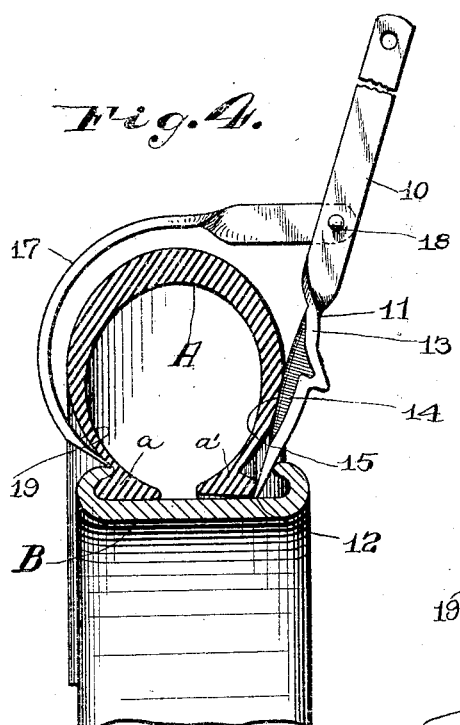
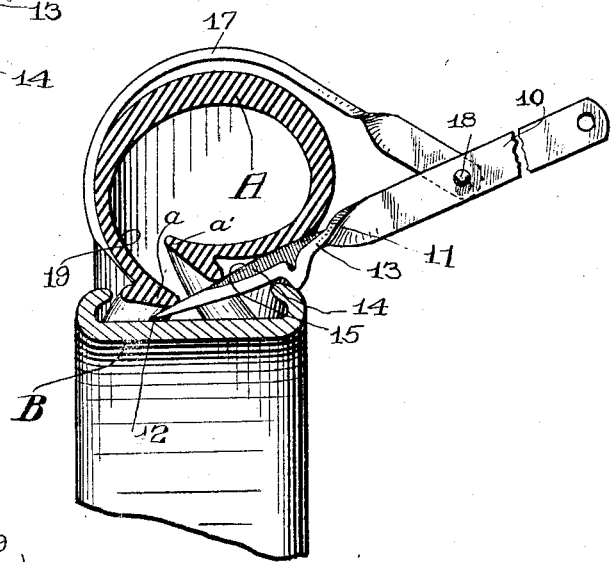
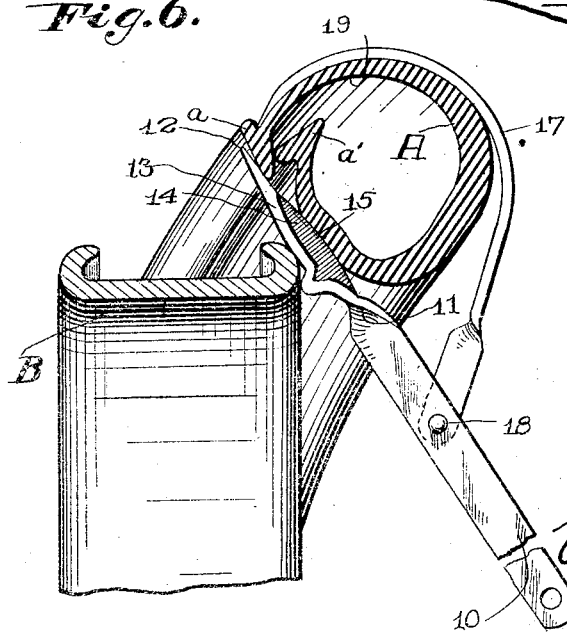
Inventor  
F. W. Fischer.  
Watson E. Coleman  
Attorney Patented Mar. 17, 1925.

1,530,313

UNITED STATES PATENT OFFICE.

FRED W. FISCHER, OF KNOXVILLE, TENNESSEE.

TIRE TOOL.

Application filed November 13, 1923. Serial No. 674,529.

*To all whom it may concern:*

Be it known that I, FRED W. FISCHER, a citizen of the United States, residing at Knoxville, in the county of Knox and State of Tennessee, have invented certain new and useful Improvements in Tire Tools, of which the following is a specification, reference being had to the accompanying drawings.

This invention relates to tire tools, and more particularly to a device for removing clincher tires from clincher rims.

One of the objects of the invention is to provide a tire removing tool of this character so formed that it may be readily inserted between the tire and the clincher flange of the rim and as it is inserted will act to wedge one wall of the tire upward from the rim and eventually reach such a position that it may be rocked upon the flange of the rim so as to readily remove the tire entirely from the rim.

A further object is to provide a device of this character so constructed that that portion of the operating lever or handle adjacent the tire and rim-engaging extremity of the lever will constitute not only a wedge whereby one wall of the tire may be wedged upward from the rim but will also constitute a fulcrum, permitting the lever to be rocked upon the rim, as before stated.

A still further object is to provide a device of this character wherein the lever is provided with a tire-embracing or bridging hook which, as the lever engages one wall of the tire, will engage the other wall thereof so that when the lever is rocked the tire may be lifted off as a whole.

Another object of the invention is to provide a device of this character in which the tire-engaging extremity of the lever, slightly above its protuberant or fulcrum constituting portion, is provided with a stop limiting the inward thrust of the lever so that the lever cannot under any circumstances engage beneath the opposite clincher bead of the tire.

Still another object is to provide a construction of this character which is very simple, which may be cheaply made, which is compact and easily transportable and light, and which has been found to be extremely effective in actual practice.

Other objects will appear in the course of the following description.

My invention is illustrated in the accompanying drawings, wherein:—

Figure 1 is a perspective view of a tire tool constructed in accordance with my invention;

Figure 2 is a fragmentary perspective view of the lower end of the lever looking toward the outside of the lever;

Figure 3 is a section on the line 3—3 of Figure 2;

Figure 4 is a sectional view through a rim and tire showing the tire tool in the first position in removing a tire;

Figure 5 is a like view to Figure 4 but showing the second position taken by the tire tool;

Figure 6 is a like view to Figures 4 and 5 but showing the position of the tool and of the tire just as the tire is about to be wrenched off or removed from the rim.

Referring to these drawings, it will be seen that my improved tire tool consists of a lever 10 which is made of a relatively heavy and strong strip of iron or steel, the tire engaging end of which is twisted so that the tire engaging end 11 of the lever is disposed in a plane at right angles to the body of the lever. This tire engaging end at its extremity is flattened and is made somewhat wider. The upper portion of this part 11 and the outer face of this portion 11 taper downward so as to form a relatively wide edge 12. The portion 11, as illustrated in Figure 3, is bulged out on each side margin, as at 13, this bulged portion thus providing two longitudinally convex protuberances or ribs. The portion 14 between these two protuberant portions 13 is preferably so formed that the inner face of this portion 14 is slightly convex, as at 15. The two protuberant ribs 13 are preferably formed to provide shoulders 16 disposed slightly beyond the crests of these protuberant portions 13. The function of these stops so formed will be later stated.

Pivoted to the shank or handle of the lever slightly above the twisted portion thereof is a hook, designated generally 17. This is formed of a strip of metal having a width slightly less than the width of the lever and pivoted by means of a rivet, bolt or other like device 18. This strip is twisted so as to form a shank portion lying flat against the shank of the lever and the hook portion 17 which is disposed at right angles to the shank portion. This hook portion is semicircular in form and the end is flattened and widened and somewhat sharpened. This hook portion is perfectly free to oscillate upon its pivot.

In the use of this device, the wedge-shaped extremity of the lever is forced down between one wall of the tire A and the flange $b$ of the rim B in the position shown in Figure 4. Previous to this the hook is engaged with the tire at the junction of the bead $a$ with the body of the tire, as illustrated in Figure 4. With the parts in the position shown in Figure 4, the handle of the lever is depressed and at the same time force is applied to shove the lever forward. As the lever is shoved forward, the wedge constituted by the convex ribs 13 and by the protuberant middle portion 14 will act to raise the tire wall and as the tool is forced downward and inward the tire wall is raised to the position shown in Figure 5 so that the flat wedge-shaped portion of the tool is beneath the clincher bead $a$ and has lifted the clincher bead $a'$ to the position shown in Figure 5. At this point the stop 16 comes against the flange $b$ and limits the further inward movement of the tool so that the tool cannot be forced inward and engage beneath the opposite flange $b$ of the rim. After the tool has been forced inward until the stop 16 bears against the flange $b$, the tool is then rocked, as shown in Figure 6, lifting the tire entirely out of the rim.

Particular attention is called to the fact that if the tire engaging end of the tool were not wedge-shaped it would not act to force one wall of the tire inward, as shown in Figure 4, nor would it act as the tool is still further forced inward to lift this wall of the tire and force it inward in overlapping relation to the opposite wall of the tire, as shown in Figure 5. If the tire wall were not forced inward, as shown in Figure 5, by the wedge-shaped end of the extremity of the tool, it would be impossible to force the clincher bead $a'$ beyond the flange $b$ and it would be impossible to detach the tire from the rim. Even where a tire is rusted upon the rim, the improved tool will secure its detachment by simply inserting the tool and oscillating it until one wall of the tire is free from its adherent engagement with the rim, and then by depressing the handle end of the lever and forcing inward on the lever, the extremity of the tool will be caused to wedge upward on the first named wall of the tire and slip beneath and rest upward on the opposite bead of the tire. After the tool has been completely engaged with the tire, it is obvious that a rocking movement of the tool will cause the tire to be lifted out of and entirely free from the rim, as shown in Figure 6.

It will be noted that in the use of this tire tool the tool acts to wedge one wall of the rim inward and the fulcrum caused by the rounded portions 13 permits the tool to be rocked so that a combination wedging and lever-like action is secured. This tool is very simple, is quickly applied, and has been found in practice to remove tires quickly from clincher rims even where the tires have rusted to the rims.

While I have illustrated certain minor details which I have found to be particularly effective, I do not wish to be limited thereto as it is obvious that many minor changes might be made in these details without departing from the spirit of the invention.

I claim:—

A tire tool comprising an elongated lever of relatively thin material, the lever being twisted adjacent one end to provide a relatively long handle portion, and a blade portion extending in a plane at right angles to the plane of the handle portion and slightly curved longitudinally, the blade portion of the lever being beveled toward its extremity and the middle of the blade portion being struck up to form a longitudinally extending rib increasing gradually in depth from the end toward the middle of the rib, the blade portion on each side of said rib being struck up to form shoulders on opposite sides of the rib and projecting from the under side of the lever, and a hook-shaped member pivotally mounted upon the lever at one end, the extremity of the hook-shaped member being beveled and normally confronting the edge of the blade portion of the lever.

In testimony whereof I hereunto affix my signature.

FRED W. FISCHER.